United States Patent
Hui et al.

(10) Patent No.: US 9,122,484 B2
(45) Date of Patent: Sep. 1, 2015

(54) METHOD AND APPARATUS FOR MASHING UP WEB APPLICATIONS

(75) Inventors: Yi Hui, Beijing (CN); Kuo Zhang, Beijing (CN); Le Kang, Xi'an High-Tech Zone (CN); Wei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1349 days.

(21) Appl. No.: 12/051,030

(22) Filed: Mar. 19, 2008

(65) Prior Publication Data

US 2008/0235656 A1    Sep. 25, 2008

(30) Foreign Application Priority Data

Mar. 19, 2007    (CN) .......................... 2007 1 0088391

(51) Int. Cl.
*G06F 17/30*    (2006.01)
*G06F 9/44*    (2006.01)

(52) U.S. Cl.
CPC ....................................... *G06F 8/36* (2013.01)

(58) Field of Classification Search
CPC ........................................................ G06F 8/36
USPC ................................................. 717/100, 104
See application file for complete search history.

(56) References Cited

U.S. PATENT DOCUMENTS

| | | | |
|---|---|---|---|
| 6,901,409 B2 | 5/2005 | Dessloch et al. | |
| 7,305,667 B1 * | 12/2007 | Saulys et al. ................. | 717/143 |
| 2003/0093402 A1 | 5/2003 | Upton | |
| 2004/0103373 A1 * | 5/2004 | Wei .............................. | 715/513 |
| 2006/0036682 A1 | 2/2006 | Fletcher et al. | |
| 2006/0173865 A1 * | 8/2006 | Fong ............................ | 707/100 |
| 2007/0288854 A1 * | 12/2007 | Koskimies ................... | 715/760 |
| 2008/0320023 A1 * | 12/2008 | Fong ............................ | 707/101 |

FOREIGN PATENT DOCUMENTS

EP    1265130    12/2002

* cited by examiner

*Primary Examiner* — Apu Mofiz
*Assistant Examiner* — Jared Bibbee
(74) *Attorney, Agent, or Firm* — Fleit Gibbons Gutman Bongini & Bianco PL; Thomas Grzesik

(57) ABSTRACT

Disclosed are a method, apparatus, and computer program, product for mashing up web applications. The method includes: obtaining at least two document object models (DOM) corresponding to at least two web applications respectively; merging nodes of the at least two document object models to obtain a new document object model; connecting, on the new document object model, the nodes belonging respectively to the at least two document object models; and obtaining a new web application from the new document object model after connection.

16 Claims, 6 Drawing Sheets

Job Application Form

This is just a little demo of Module Arragation

As you type in the text below, notice how your input is auto corrected and also the auto completion on the state field.

Name And Address

| | |
|---|---|
| Name* | |
| Address | |
| City* | *This value is required.* |
| State | Alabama ⌄ |
| Zip* | *This value is required.* |

Skills  Custom checkboxes have custom images...

☐ IT
☐ Marketing
☐ Business

Self description  Rich text editor that expands as you type in text

| Normal ⌄ | ≣ ≣ | B *I* U S̶ 🖼 |

Write a brief summary of *your* job skills... using rich text.

Desired employment length

```
[ foo            ]  [ search the web for "foo" ]

Returned Content:

None.
```

FIG. 2C

Job Application Form

This is just a little demo of Module Arragation

As you type in the text below, notice how your input is auto corrected and also this auto completion on the state field.

Name And Address

Name*  [            ]
Address [            ]
City*   [            ]  *This value is required.
State   [ Alabama ▽ ]
Zip*    [            ]  *This value is required.

Skills   Custom checkboxes have custom images...

☐ IT
☐ Marketing
☐ Business

Self description   Rich text editor that expands as you type in text

[ Normal ▽ ] [≡][≡] B *I* U 𝔖 👁

Write a brief summary of your job skills.... using rich text.

---

[ Eric            ]  [ Searching Eric...... ]

Returned Content:

http://www.eric.ed.gov/
National information system providing users with ready access to an extensive body of education-related literature. Full-text articles and monographs can also be purchased online.

http://www.emotioneric.com/
Eric conveys different emotions with the use of a webcam. Requests are taken and encouraged.

http://www.eduref.org/
Provides education-related links, lesson plans, news, and information.

http://www.eric.ed.gov/ERICWebPortal/Home.portal?_nf
Advanced Search. Search for Line 1 Field:

METHOD AND APPARATUS FOR MASHING UP WEB APPLICATIONS

CROSS-REFERENCE TO RELATED APPLICATIONS

This application is based upon and claims priority from a prior Chinese Patent Application No. 200710088391.7, filed on Mar. 19, 2007, the entire disclosure of which is herein incorporated by reference in its entirety.

FIELD OF THE INVENTION

The present invention relates to the field of information technology, and more particularly, to web-based application aggregation technology.

BACKGROUND OF THE INVENTION

With the vigorous growth of World Wide Web, more and more services are provided to users via web applications. The mashing up among different web applications in a simple and efficient way in order to form new web applications is becoming an increasingly pressing need.

Currently, the major approach of mashing up web applications is performed by means of application programming interfaces (API). Specifically, the owner of a web application needs to expose the relevant API in order to let the web application be mashed up by other users.

For example, with the API of Google map, a user can integrate customized data, e.g. weather forecast, on top of Google map.

However, owners of many web applications do not explicitly define and expose relevant APIs for reasons, such as costs, difficulty in transforming an existing application system and the like.

Therefore, the aforesaid solution of mashing up web applications using the APIs of web applications has limitation. That is, if the owner of a web application does not expose the relevant API, then users cannot use the web application for mashing up.

To sum up, there is a need to propose a solution of mashing up web applications without depending on the APIs of web applications, so as to increase the flexibility and the applicability of mashing up web applications.

SUMMARY OF THE INVENTION

It is an object of the present invention to provide a method and apparatus for mashing up web applications, which can mash up at least two web applications without depending on the API of any one of the web applications.

To this end, the present invention proposes a method for mashing up web applications, comprising the steps of: obtaining at least two document object models (DOM) corresponding to at least two web applications respectively; merging nodes of said at least two document object models to obtain a new document object model; connecting, on said new document object model, the nodes belonging respectively to said at least two document object models; and obtaining a new web application from said new document object model after connection.

The present invention further proposes an apparatus for mashing up web applications, comprising: a parser for obtaining at least two document object models (DOM) corresponding to at least two web applications respectively; a merger for merging nodes of said at least two document object models to obtain a new document object model; a connector for connecting, on said new document object model, the nodes belonging respectively to said at least two document object models; and a creator for obtaining a new web application from said new document object model after connection.

The present invention still further proposes a computer program product containing program instructions for implementing the method described above.

Compared with the existing solutions for mashing up web applications, the present invention uses DOMs of web applications to mash up, other than invoking APIs of web applications directly. In other words, mashing up web applications can be implemented without the support of APIs in the present invention. As a result, the flexibility and adaptability of mashing up is improved dramatically, as DOMs of web applications can be easily obtained.

BRIEF DESCRIPTION ON THE DRAWINGS

Other objects and effects of the present invention will become more apparent and easy to understand from the following description, taken in conjunction with the accompanying drawings wherein:

FIG. 2A depicts a page of a web application used for mashing up as displayed on a browser;

FIG. 2B depicts a page obtained from a web application used for mashing up as displayed on a browser;

FIG. 2C depicts a page obtained from a web application, which is obtained from mashing up, as displayed on a browser;

Figure 4A:
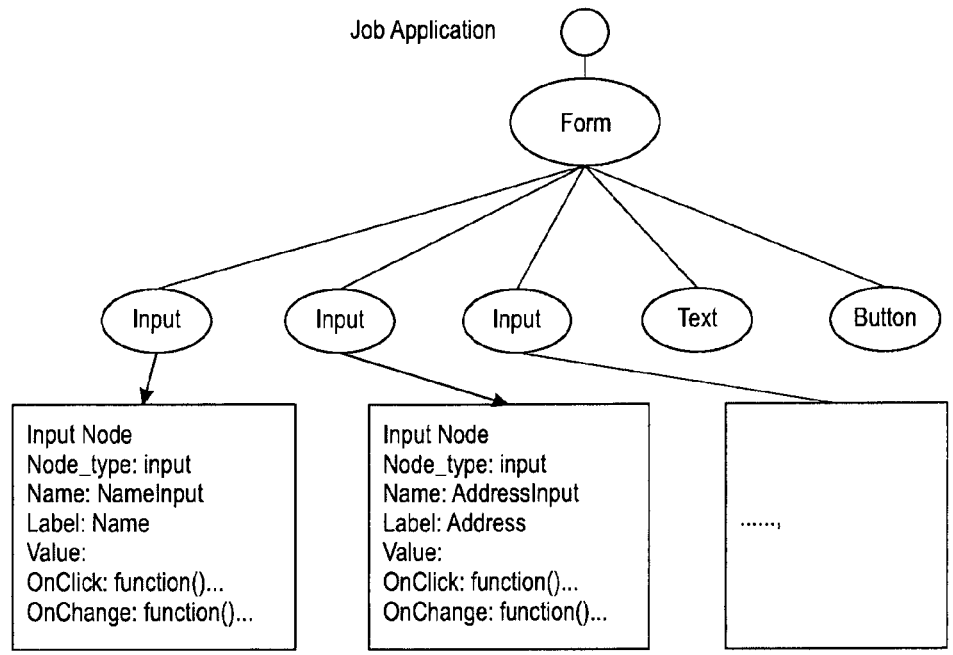
Figure 4B:
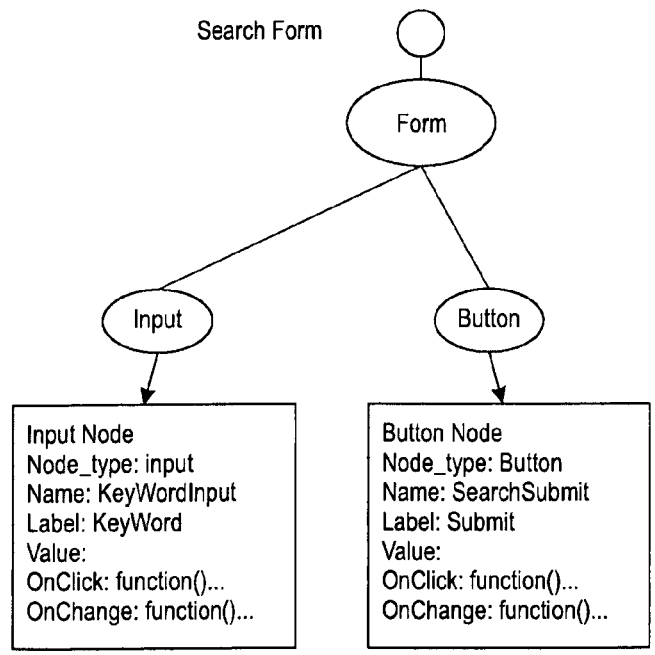
Figure 4C:
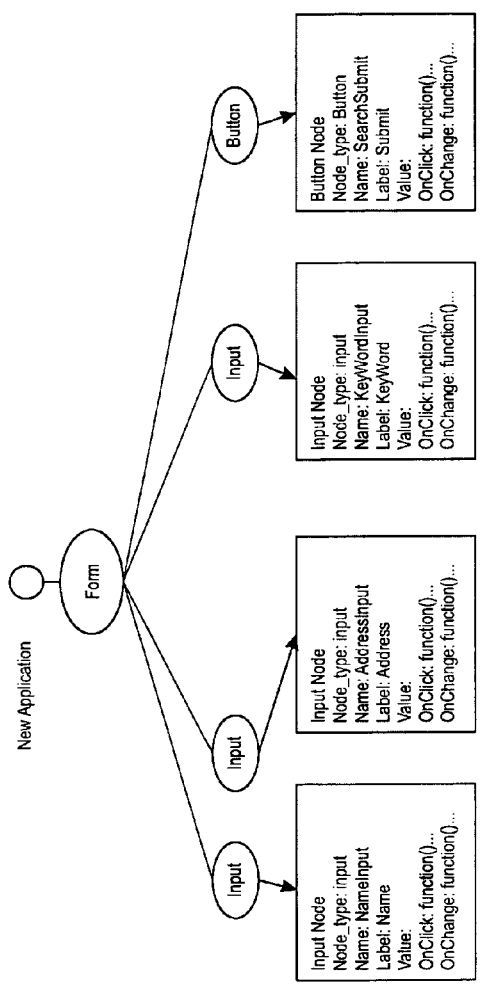
Figure 5:
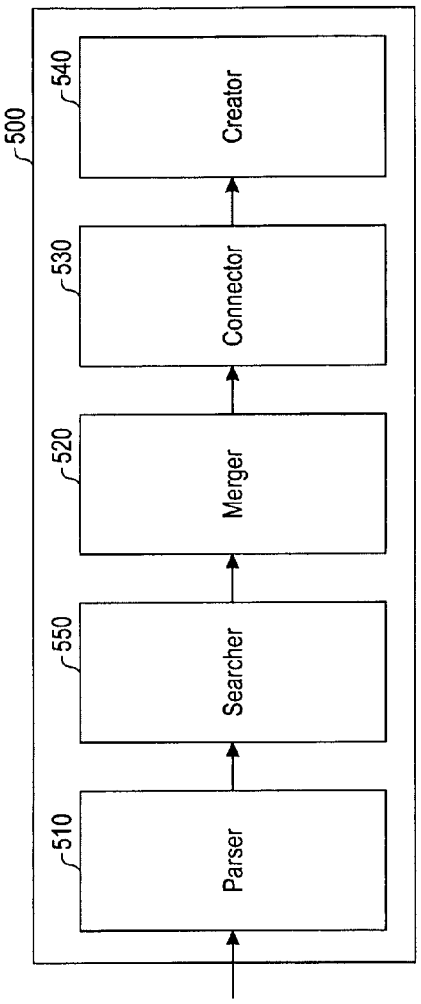

FIG. 4A schematically depicts a DOM;

FIG. 4B schematically depicts another DOM;

FIG. 4C schematically depicts a DOM obtained from merging the two DOMs depicted in FIGS. 4A and 4B;

FIG. 5 depicts a block diagram of an apparatus for mashing up web applications according to an embodiment of the present invention.

Like reference numerals designate the same, similar, or corresponding features or functions throughout the drawings.

DETAILED DESCRIPTION

The fundamental idea of the present invention is to use document object models (DOM) of at least two selected web applications to mash up these web applications, so as to obtain a new web application conveniently. According to an embodiment of the present invention, DOMs of at least two selected web applications are obtained first. Nodes of DOMs of these web applications are then merged together to obtain a new DOM. Next, nodes belonging respectively to DOMs of these web applications are connected on the new DOM. A new web application is obtained from the new DOM after connection.

Hereinafter, the present invention will be described in conjunction with a concrete embodiment.

Figure 1:
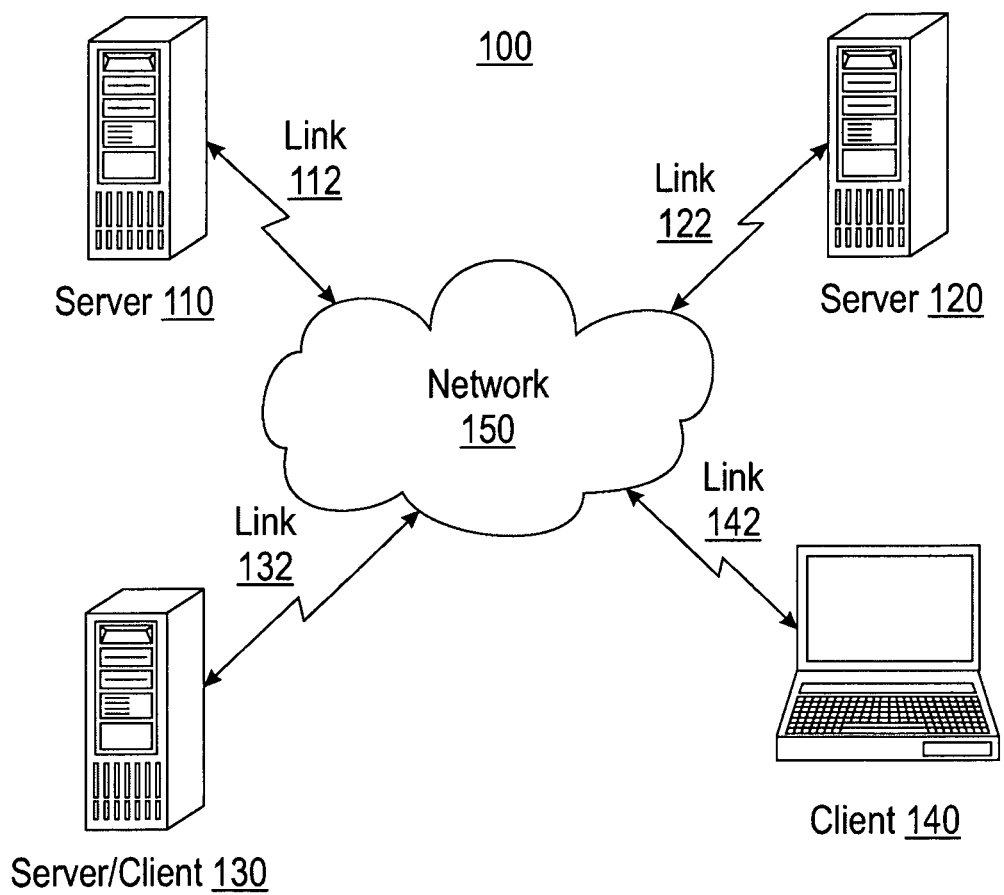
FIG. 1 depicts a system 100 in which the present invention can be implemented.

FIG. 1 depicts a system 100 in which the present invention can be implemented. As depicted in FIG. 1, system 100 comprises a server 110, a server 120, a server/client 130, a client 140 and a network 150. Each of server 110, server 120, server/client 130 and client 140 may be a laptop computer, a small computer or a medium computer. Server 110 is connected to network 150 via a link 112; server 120 is connected to network 150 via a link 122; server/client 130 is connected to network 150 via a link 132; and client 140 is connected to network 150 via a link 142. Links 112, 122, 132 and 142 may be wired links, such as coaxial cables and optical fibers, or may be wireless links, such as satellite links. Additionally, network 150 may be a wireless network, a wired network or a combination thereof. Additionally, network 150 may be a local area network, a metropolitan area network, a wide area network, or a combination thereof. For example, network 150 may be the Internet.

Of course, those skilled in the art should understand that other clients and/or servers may be connected on network 150. Moreover, in order to differentiate one another, clients and servers may have identifiers capable of identifying them uniquely, such as IP addresses and universal resource locators (URL).

In this embodiment of the present invention, a web application for applying for a job is running on server 110. When the web application for applying for a job on server 110 is accessed using a browser, such as IE, Firefox and the like, on server/client 130 or client 140, a page as depicted in FIG. 2A will be displayed on the browser. As depicted in FIG. 2A, a user can apply for a job on this page, for example, input name, address and other information into the input box about name and address, make selection in the checkbox about job skills, and fill in the input box about self description. The user can submit his/her inputs/selection to server 110 by clicking a button (not depicted).

A web application for search (similar to Google search application) is running on server 120. When the web application for search on server 120 is accessed using a browser, such as IE, Firefox and the like, on server/client 130 or client 140, a page that can result in the page as depicted in FIG. 2B will be displayed on the browser. As depicted in FIG. 2B, after a user inputs desired search content "foo" into the input box and then clicks a button to submit the content for searching, "None" result is obtained. The user can submit his/her desired search content to server 120 by clicking a button (FIG. 2B schematically depicts a button shown as "search the web for "foo"").

As described below, server/client 130 serves as a client in some cases and serves as a server in other cases.

In this embodiment of the present invention, selected web applications are mashed up in server/client 130. When mashing up web applications, server/client 130 serves as a client.

Moreover, a new web application obtained from mashing up is running on server/client 130, at which point server/client 130 serves as a server.

In this embodiment of the present invention, it is intended to obtain such a web application: when client 140 accesses the web application obtained from mashing up on server/client 130 using a browser, such as IE, Firefox and the like, a page that can result in a page as depicted in FIG. 2C will be displayed on a browser.

As depicted in FIG. 2C, when a user inputs name, address and other information (Eric) into the input box about name and address on the left, results from searching the input information (Eric) will be displayed on the right. That is to say, the web application obtained from mashing up combines and connects the web application on server 110 and the web application on server 120.

Figure 3:
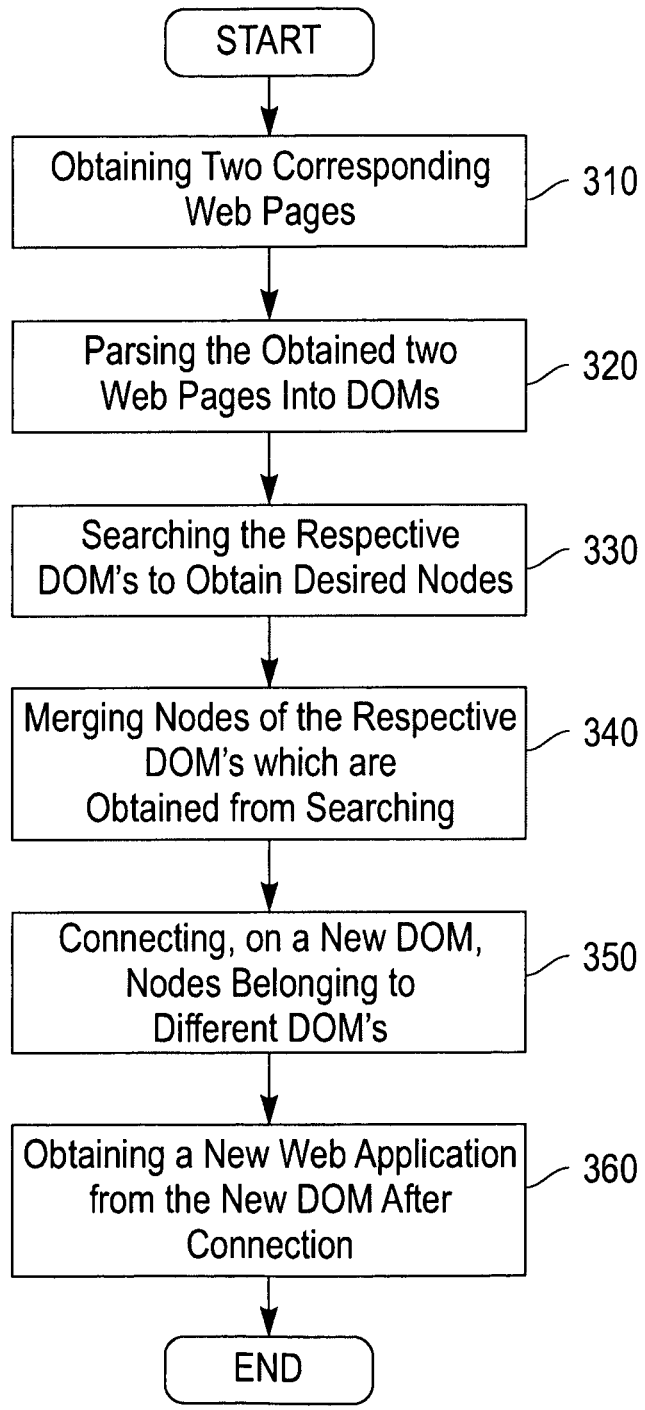
FIG. 3 depicts a flowchart of a method for mashing up web applications according to an embodiment of the present invention.

FIG. 3 depicts a flowchart of a method for mashing up two web applications according to an embodiment of the present invention.

First, the web application for applying for a job on server 110 and the web application for search on server 120 are accessed via their respective URLs, so as to obtain two corresponding web pages (step 310).

Then, the two obtained web pages are parsed into DOMs (step 320).

For example, the web pages may be parsed by means of the following JavaScript codes, so as to obtain corresponding DOMs.

```
var widget = document.createElement("div");
    dojo.io.bind({
        url: URL,
        mimetype: "text/plain",
        load: function(type, text, e) {
            widget.innerHTML = text;
            var parser = new dojo.xml.Parse( );
            var dom= parser.parseElement(widget, null, true);
        }//load
    });//bind
}
```

For another example, the DOM of a web page may be obtained using the DOM Inspector tool in the Firebox browser.

FIG. 4A schematically depicts a DOM that is a simplified version of the DOM corresponding to the web page depicted in FIG. 2A. Special attention should be paid to input nodes (corresponding to the input box about name and address in FIG. 2A) of the DOM in FIG. 4A. Since the information depicted in FIG. 4A is easy to understand to those skilled in the art, detailed description of FIG. 4A are omitted here for the purpose of succinctness.

FIG. 4B schematically depicts another DOM that is a simplified version of the DOM corresponding to the web page depicted in FIG. 2B. Special attention should be paid to the input node and the button node of the DOM in FIG. 4B. Since the information depicted in FIG. 4B is easy to understand to those skilled in the art, detailed description of FIG. 4B are omitted here for the purpose of succinctness.

Returning to FIG. 3, desired nodes are found by searching the DOMs depicted in FIGS. 4A and 4B in step 330.

In this embodiment of the present invention, all input nodes of the DOMs can be found by means of such a JavaScript function as document.getElementsByTags("input").

In step 340, a new DOM is formed by merging desired nodes of respective DOMS, which are obtained from searching.

FIG. 4C schematically depicts a new DOM that is formed by merging some nodes of the DOMs depicted in FIGS. 4A and 4B. As depicted in FIG. 4C, two input nodes on the left come from the DOM depicted in FIG. 4A, and an input node and a button node on the right come from the DOM depicted in FIG. 4B.

Those skilled in the art should understand that nodes of respective DOMs may be merged in various ways to form a new DOM. As a result, there is only difference in the display effect of the page of the web application corresponding to the new DOM on the browser, but the function remains the same.

Of course, those skilled in the art should understand that step 330 is optional. In other words, a new DOM may be formed by merging all nodes of the DOMs depicted in FIGS. 4A and 4B without performing a search.

In step 350, corresponding nodes that belong to different DOMs (e.g. the two DOMs depicted in FIGS. 4A and 4B) are connected on the new DOM. Through connection, new function can be realized on the basis of respective source web applications.

A conventional connection approach is an intrusive approach, i.e. modifying codes of original web applications, adding new codes to some triggering points and thereby achieving the connection between different web applications.

Different from the conventional connection approach, connection is achieved by a non-intrusive monitoring mechanism in this embodiment of the present invention.

Under this mechanism, a global monitor is initialized first. This monitor can monitor not only conventional user events, such as a click of a node (e.g. button node) of the DOM and movement of the mouse, but also triggering of any function. Therefore, with the monitor, a developer can dynamically add a custom extra function before or after any function is triggered and without modifying codes of the original web applications.

Developers can write, for example, the following connection codes:

```
Connector.connect(sourceApplication,sourceFunction,targetApplication,targetFunction)
```

The codes mean when sourceFunction of sourceApplication is triggered, targetFunction of targetApplication is also triggered.

Furthermore, through setting parameters, developers can also set whether targetFunction is triggered before or after sourceFunction takes place. In the case that targetFunction is triggered before sourceFunction takes place, values of input parameters of the sourceFunction can be changed via an extra function before sourceFunction takes place.

With such a mechanism, it is able to connect different web applications in a flexible and non-intrusive way and thereby achieve rapid non-intrusive mashing up without depending on APIs.

Nodes belonging to respective DOMs can be connected on the new DOM depicted in FIG. 4C using the following codes:

```
Application.Connect("JobApplication.NameInput", on Change, "SearchForm.SearchSubmit",onClick, passvalue)
```

Where passvalue is a user-custom additional function, which takes place before SearchForm.SearchSubmit.onClick is triggered. The codes thereof is as follows:

```
function passvalue( ){
    SearchForm.KeywordInput.value = JobApplication.NameInput.value;
}
```

And the function thereof is to pass the value input into the name input box in JobApplication to KeyWordInput of SearchForm.

More specifically, when it is monitored that OnChange event of NameInput takes place, the value of NameInput is passed to KeywordInput and Onclick event of Submit is triggered.

In this way, when a user inputs the name (Eric) into the input box about name and address on the left, results from searching the input name (Eric) are displayed on the right.

Returning to FIG. 3 again, a new web application is obtained from the connected new DOM in step 360. Since codes written in various languages and for obtaining a web application from DOM already exist in the prior art, details thereof are omitted here.

FIG. 5 depicts a block diagram of an apparatus 500 for mashing up web applications according to an embodiment of the present invention.

Apparatus 500 for mashing up web applications may be a tool written in JavaScript and based on a browser.

As depicted in FIG. 5, apparatus 500 for mashing up web applications comprises: a parser 510 for obtaining at least two document object models corresponding to at least two web applications respectively; a merger 520 for merging nodes of the at least document object models to obtain a new document object model; a connector 530 for connecting nodes belonging to said at least two document object models on said new document object model; and a creator 540 for obtaining a new web application from the new document object model after connection.

Apparatus 500 for mashing up web applications may further comprise a searcher 550 for searching at least two document object models to retrieve desired nodes; and that merger 520 merges nodes of said at least two document object models is implemented by merging the desired nodes that have been retrieved.

Connector 530 may connect nodes belonging to said at least two document object models based on the aforesaid non-intrusive way.

It should be noted that in order to facilitate easier understanding of the present invention, the foregoing description omits some detailed technical details that are well known to those skilled in the art and might be indispensable to the implementation of the present invention.

The specification of the present invention has been presented for purposes of illustration and description, and is not intended to be exhaustive or limited to the invention in the form disclosed. Many modifications and variations will be apparent to those of ordinary skill in the art.

For example, those skilled in the art should understand that in the previously described embodiments, the number of web applications that are mashed up to form a new web application is not limited to two, but may be three or more.

Therefore, the embodiments were chosen and described in order to best explain the principles of the invention, the practical application thereof, and to enable those of ordinary skill in the art to understand that all modifications and alterations made without departing from the spirit of the present invention fall into the protection scope of the present invention as defined in the appended claims.

What is claimed is:

1. A method for mashing up web applications, comprising:
accessing a first web page corresponding to a first web application executing on a server;
accessing at least a second web page corresponding to at least a second web application executing on a server, wherein the first web application is separate and distinct from the second web application;
generating, with an information processing system and based on the first and second web pages that have been accessed, at least two document object models (DOM) corresponding to the first and second web applications, respectively;
searching each of the at least two DOMs for nodes of a given type;

merging, based on the searching, a first set of nodes of the given type from a first document object model of the at least two document object models and at least a second set of nodes of the given type from at least a second DOM of the at least two document object models to obtain a new document object model, wherein the new document object model comprises both the first set of nodes and the second set of nodes;

connecting, on the new document object model, the nodes belonging respectively to the at least two document object models, where the connecting comprises establishing code within the new document object model configuring a function of the first web application represented by one of the first set of nodes as a source function and configuring a function of the second web application represented by one of the second set of nodes as a target function of the source function; and obtaining a new web application from the new document object model after connection, wherein the new web application comprises functions associated with the first web application and the at least second web application in response to the first set of nodes and the at least second set of nodes being merged.

2. The method according to claim 1, prior to the merging, further comprises:
searching the at least two document object models to find the nodes.

3. The method according to claim 1, wherein nodes belonging respectively to the at least two document object models are connected based on a non-intrusive way.

4. The method according to claim 1, wherein nodes belonging respectively to the at least two document object models are connected based on monitoring user events and triggering of any function associated with the nodes belonging respectively to the at least two document object models.

5. An information processing system for mashing up web applications, comprising:
a memory;
a processor communicatively coupled to the memory; and
an apparatus for mashing up web applications communicatively coupled to the memory and the processor, the apparatus configured to perform a method comprising:
accessing a first web page corresponding to a first web application executing on a server;
accessing at least a second web page corresponding to at least a second web application executing on a server, wherein the first web application is separate and distinct from the second web application;
generating, based on the first and second web pages that have been accessed, at least two document object models (DOM) corresponding to the first and second web applications respectively;
searching each of the at least two DOMs for nodes of a given type;
merging, based on the searching, nodes a first set of nodes of the given type from a first document object model of the at least two document object models and at least a second set of nodes of the given type from at least a second DOM of the at least two document object models to obtain a new document object model, wherein the new document object model comprises both the first set of nodes and the second set of nodes;
connecting, on the new document object model, the nodes belonging respectively to the at least two document object models, where the connecting comprises establishing code within the new document object model configuring a function of the first web application represented by one of the first set of nodes as a source function and configuring a function of the second web application represented by one of the second set of nodes as a target function of the source function; and obtaining a new web application from the new document object model after connection, wherein the new web application comprises functions associated with the first web application and the at least second web application in response to the first set of nodes and the at least second set of nodes being merged.

6. The apparatus according to claim 5, wherein the method further comprises:
prior to the merging, searching the at least two document object models to find the nodes.

7. The apparatus according to claim 5, wherein nodes belonging respectively to the at least two document object models are connected based on a non-intrusive way.

8. The apparatus according to claim 5, wherein nodes belonging respectively to the at least two document object models are connected based on monitoring user events and triggering of any function associated with the nodes belonging respectively to the at least two document object models.

9. The apparatus according to claim 8, wherein nodes belonging respectively to the at least two document object models are connected based on the non-intrusive monitor monitoring user events and triggering of any function associated with the nodes belonging respectively to the at least two document object models.

10. The apparatus according to claim 9, nodes belonging respectively to the at least two document object models are connected,
where the method further comprises adding one or more custom extra functions at least one of before and after any function associated with the connected nodes belonging respectively to the at least two document object models.

11. The apparatus according to claim 10, wherein the added one or more custom extra functions are added at least one of before and after any function associated with the connected nodes according to parameters set by a user.

12. The apparatus according to claim 5, wherein the apparatus comprises a tool written in JavaScript and based on a browser for mashing up web applications.

13. A program product embodied in a non-transitory computer readable medium comprising program code for performing a method of:
accessing a first web page corresponding to a first web application executing on a server;
accessing at least a second web page corresponding to at least a second web application executing on a server, wherein the first web application is separate and distinct from the second web application;
generating, at least two document object models (DOM) corresponding to the first and second web applications, respectively;
searching each of the at least two DOMs for nodes of a given type;
merging, based on the searching, a first set of nodes of the given type from a first document object model of the at least two document object models and at least a second set of nodes of the given type from at least a second DOM of the at least two document object models to obtain a new document object model, wherein the new document object model comprises both the first set of nodes and the second set of nodes;
connecting, on the new document object model, the nodes belonging respectively to the at least two document object models, where the connecting comprises establishing code within the new document object model configuring a function of the first web application represented by one of the first set of nodes as a source function and configuring a function of the second web application represented by one of the second set of nodes as a target function of the source function; and obtaining a new web application from the new document object model after connection, wherein the new web application comprises functions associated with the first web application and the at least second web application in response to the first set of nodes and the at least second set of nodes being merged.

14. The program product according to claim 13, wherein prior to the merging, further comprising:

searching the at least two document object models to find the nodes.

15. The program product according to claim 13, wherein nodes belonging respectively to the at least two document object models are connected based on a non-intrusive way.

16. The program product according to claim 13, wherein nodes belonging respectively to the at least two document object models are connected based on monitoring user events and triggering of any function associated with the nodes belonging respectively to the at least two document object models.

* * * * *